(12) United States Patent
Staubach

(10) Patent No.: US 12,129,774 B2
(45) Date of Patent: Oct. 29, 2024

(54) HYDROGEN FUELED TURBINE ENGINE PINCH POINT WATER SEPARATOR

(71) Applicant: RAYTHEON TECHNOLOGIES CORPORATION, Farmington, CT (US)

(72) Inventor: Joseph B. Staubach, Colchester, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/316,505

(22) Filed: May 12, 2023

(65) Prior Publication Data

US 2023/0407768 A1  Dec. 21, 2023

Related U.S. Application Data

(60) Provisional application No. 63/343,650, filed on May 19, 2022.

(51) Int. Cl.
*F01K 15/02* (2006.01)
*B01D 45/16* (2006.01)
*B01D 53/26* (2006.01)
*F02C 7/16* (2006.01)

(52) U.S. Cl.
CPC .............. *F01K 15/02* (2013.01); *B01D 45/16* (2013.01); *B01D 53/265* (2013.01); *F02C 7/16* (2013.01); *B01D 2257/80* (2013.01); *B01D 2259/4575* (2013.01); *F05D 2260/211* (2013.01)

(58) Field of Classification Search
CPC ......... F05D 2220/323; F05D 2260/211; F05D 2220/72; F05D 2220/32; F05D 2220/60; F02C 7/141; F02C 3/22; F02C 7/16; F01K 15/02
See application file for complete search history.

(56) References Cited

U.S. PATENT DOCUMENTS 11,536,153 B2 * 12/2022 Morgan ................... F02C 6/20
11,603,798 B1 * 3/2023 Terwilliger ............... F02C 7/18
(Continued)

FOREIGN PATENT DOCUMENTS

EP        4279722 A1 * 11/2023 ............ B01D 45/16
WO  WO-2022028653 A1 *  2/2022 ............ B64D 27/18

OTHER PUBLICATIONS

European Search Report for European Application No. 23174393.1 mailed Oct. 17, 2023.

*Primary Examiner* — Craig Kim
(74) *Attorney, Agent, or Firm* — Carlson, Gaskey & Olds, P.C.

(57) ABSTRACT

A propulsion system for an aircraft includes a gas generating core engine that generates an exhaust gas flow that is expanded through a turbine section. A power turbine engine is forward of the core engine and is coupled to drive a propulsor. A hydrogen fuel system supplies hydrogen fuel to the combustor through a fuel flow path. A condenser extracts water from the exhaust gas flow. A water separator is in communication with the condenser and directs the extracted water to a water storage tank. An evaporator receives a portion of the water that is extracted by the condenser and generates a steam flow. The steam flow is injected into the core flow path upstream of the turbine section.

16 Claims, 3 Drawing Sheets

(56) References Cited

U.S. PATENT DOCUMENTS

| | | | | |
|---|---|---|---|---|
| 11,635,022 B1* | 4/2023 | Terwilliger | ............... | F02C 9/00 |
| | | | | 60/775 |
| 11,808,209 B1* | 11/2023 | Sobanski | ................... | F02C 6/18 |
| 11,828,200 B2* | 11/2023 | Terwilliger | .............. | F01K 27/02 |
| 2014/0252160 A1* | 9/2014 | Suciu | ...................... | F02K 3/077 |
| | | | | 60/797 |
| 2016/0169102 A1* | 6/2016 | Hanrahan | ............... | F02K 3/115 |
| | | | | 60/39.42 |
| 2018/0073428 A1* | 3/2018 | Morgan | ................... | F02C 6/206 |
| 2019/0284965 A1* | 9/2019 | Retersdorf | ................ | F02C 7/32 |
| 2019/0375512 A1* | 12/2019 | Ribeiro | ................. | B64D 31/14 |
| 2020/0039657 A1* | 2/2020 | Ransom | .................... | F02C 6/14 |
| 2021/0207500 A1* | 7/2021 | Klingels | ................ | F01K 23/10 |
| 2023/0286661 A1* | 9/2023 | Klingels | ................ | B64D 29/06 |
| 2023/0407768 A1* | 12/2023 | Staubach | .................. | F02K 3/06 |

\* cited by examiner

HYDROGEN FUELED TURBINE ENGINE PINCH POINT WATER SEPARATOR

CROSS-REFERENCE TO RELATED APPLICATION

The present disclosure claims priority to U.S. Provisional Application No. 63/343,650 filed May 19, 2022.

TECHNICAL FIELD

The present disclosure relates generally to a hydrogen powered aircraft propulsion system and, more particularly to hydrogen steam injected and intercooled turbine engine.

BACKGROUND

Reduction and/or elimination of carbon emissions generated by aircraft operation is a stated goal of aircraft manufacturers and airline operators. Gas turbine engines compress incoming core airflow, mix the compressed airflow with fuel that is ignited in a combustor to generate a high energy exhaust gas flow. Some energy in the high energy exhaust flow is recovered as it is expanded through a turbine section. Even with the use of alternate fuels, a large amount of energy in the form of heat is simply exhausted from the turbine section to atmosphere. The lost heat reduces the overall efficiency of the engine Turbine engine manufacturers continue to seek further improvements to engine performance including improvements to reduce environmental impact while improving propulsive efficiencies.

SUMMARY

A propulsion system for an aircraft according to an exemplary embodiment of this disclosure, among other possible things includes a gas generating core engine that includes a core flow path where a core airflow is compressed in a compressor section, communicated to a combustor section, mixed with a hydrogen based fuel and ignited to generate an exhaust gas flow that is expanded through a turbine section. A power turbine engine is forward of the core engine. A propulsor is coupled to the power turbine. A hydrogen fuel system is configured to supply hydrogen fuel to the combustor through a fuel flow path. A condenser is arranged along the core flow path and is configured to extract water from the exhaust gas flow. A water separator is in communication with the condenser that directs the extracted water to a water storage tank. An evaporator is arranged along the core flow path and is configured to receive a portion of the water that is extracted by the condenser to generate a steam flow. The steam flow is injected into the core flow path upstream of the turbine section.

In a further embodiment of the foregoing, the water separator includes an inlet portion, a radial portion and an outlet portion. The radial portion directs a flow of a water and gas radially outward.

In a further embodiment of any of the foregoing, the inlet portion includes an inlet flow area. The radial portion includes a radial flow area and the outlet portion includes an outlet flow area. The radial flow area is less than either the inlet flow area or the outlet flow area.

In a further embodiment of any of the foregoing, the propulsion system includes an outlet that is disposed between the radial portion and the outlet portion. The outlet is in fluid communication with the water storage tank.

In a further embodiment of any of the foregoing, a radial flow force component is induced into the flow within the radial portion for expelling water through the outlet and directing gas flow to the outlet portion.

In a further embodiment of any of the foregoing, the outlet is disposed on a radially outer side of the water separator.

In a further embodiment of any of the foregoing, the turbine section of the core engine is engine forward of the compressor section and an inlet duct communicates inlet air to the compressor section.

In a further embodiment of any of the foregoing, the evaporator is disposed within an axial space forward of the power turbine.

In a further embodiment of any of the foregoing, the propulsion system includes an exhaust duct that communicates exhaust flow from the power turbine to the condenser. The exhaust duct is engine forward of the core engine.

In a further embodiment of any of the foregoing, the condenser is in thermal communication with a cold sink.

In a further embodiment of any of the foregoing, the propulsion system includes an intercooling system to cool portions of the core airflow in the compressor section. The intercooling system is configured to inject water that is communicated from the condenser into the compressor section.

In a further embodiment of any of the foregoing, the propulsion system includes a cooled cooling air passage that communicates core flow from the compressor section to the turbine section. A heat exchanger is disposed to cool the core flow with water from the condenser.

In a further embodiment of any of the foregoing, the steam flow from the evaporator is injected into the combustor.

In a further embodiment of any of the foregoing, the propulsion system includes a gearbox that is coupled to the power turbine. The power turbine is configured to drive the propulsor section through the gearbox.

A propulsion system for an aircraft according to an exemplary embodiment of this disclosure, among other possible things includes a gas generating core engine that includes a core flow path that is axially arranged through a compressor section, a combustor section and a turbine section. The turbine section is engine forward of the compressor section. A hydrogen fuel system is configured to supply a hydrogen fuel to the combustor through a fuel flow path. A condenser arranged engine is forward of the turbine section and is configured to extract water from an exhaust gas flow. A water separator is in communication with the condenser and directs the extracted water radially outward through an outlet to a water storage tank. An evaporator is arranged along the core flow path and is configured to receive a portion of the water that is extracted by the condenser to generate a steam flow. The steam flow is injected into the core flow path upstream of the turbine section.

In a further embodiment of the foregoing, the water separator includes an inlet portion, a radial portion and an outlet portion. The radial portion directs a flow of a water and gas radially outward.

In a further embodiment of any of the foregoing, the inlet portion includes an inlet flow area. The radial portion includes a radial flow area and the outlet portion includes an outlet flow area. The radial flow area is less than either the inlet flow area or the outlet flow area.

In a further embodiment of any of the foregoing, a radial flow force component is induced into the flow within the radial portion for expelling water through the outlet and directing gas flow to the outlet portion.

In a further embodiment of any of the foregoing, the propulsion system includes a power turbine engine forward of the turbine section. The power turbine is rotatable independent of the turbine section. The exhaust gas flow is communicated engine forward from the turbine section to the power turbine.

In a further embodiment of any of the foregoing, the propulsion system includes an exhaust duct that communicates exhaust flow from the power turbine to the condenser. The exhaust duct is engine forward of the core engine.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
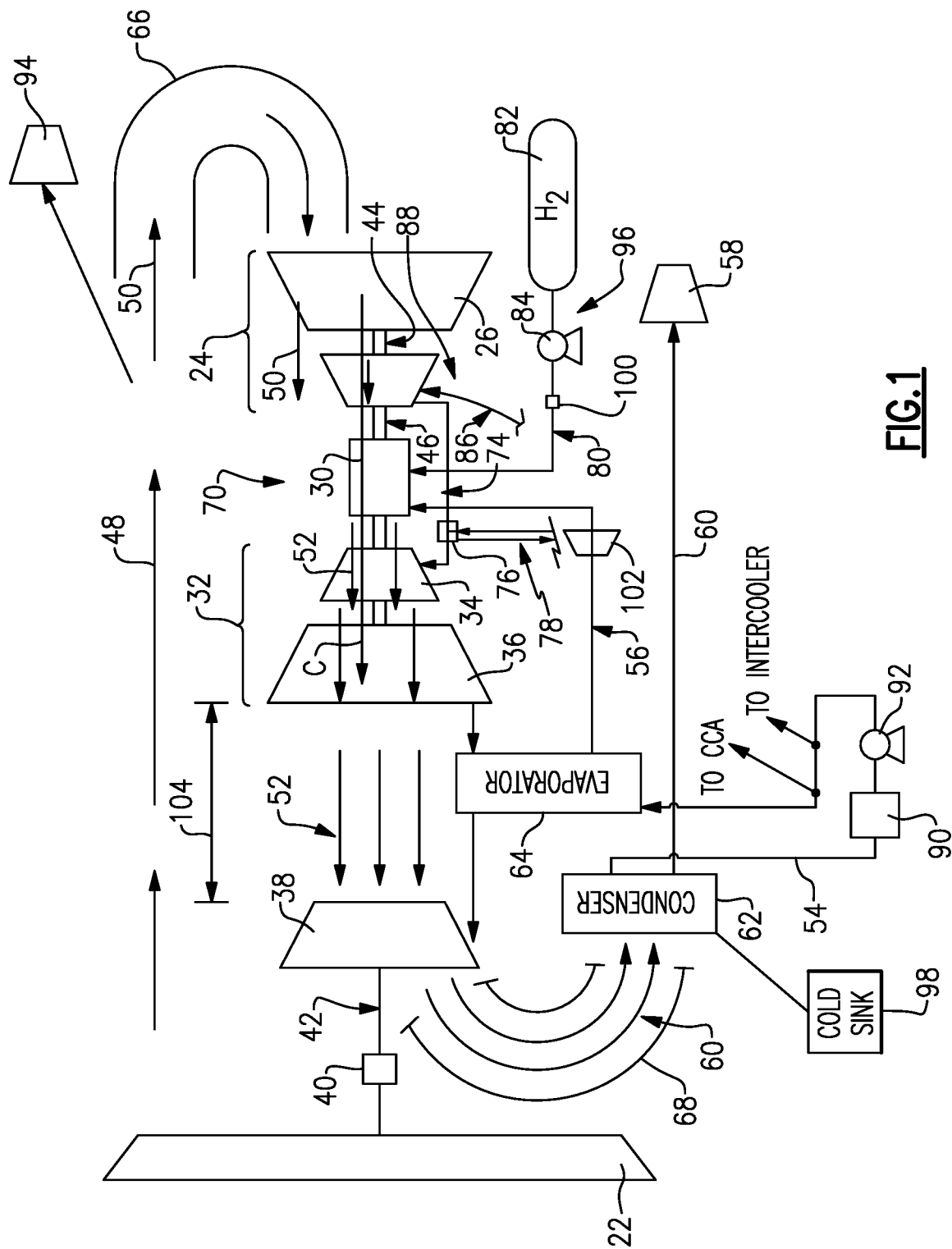
FIG. 1 is a schematic view of an example propulsion system embodiment.

FIG. 1 schematically illustrates an example reverse flow hydrogen steam injected inter-cooled turbine engine that is generally indicated at 20. The engine 20 includes a gas generating core engine 70 with a core airflow path C through a compressor section 24, a combustor and a turbine section 32. The turbine section 32 is engine forward of the compressor section 24 and the combustor 30. A power turbine 38 is spaced apart from the turbine section and receives exhaust gas flow 52 from the gas generating core engine 70. The gas flow 52 expands through power turbine 38 to drive a drive shaft 42. The drive shaft 42 drives a propulsor 22. In this disclosed embodiment, the propulsor 22 is fan driven by the drive shaft 42 through a speed reduction gearbox 40.

The fan 22 drives inlet air into an inlet duct 66 that is communicated to the compressor section 24. A core airflow 50 is communicated through the inlet duct 66 into the compressor section 24. A bypass flow 48 is communicated around and past the core engine 70.

In the compressor section 24, the core flow 50 is compressed and communicated to the combustor 30. In the combustor 30, the core flow 50 is mixed with a hydrogen (H 2) fuel flow 80 and ignited to generate the high energy exhaust gas flow 52 that expands through the turbine section 32 where energy is extracted and utilized to drive the compressor section 24. The exhaust gas flow 52 exhausted from the turbine section 32 of the gas generating core engine 70 is communicated to the power turbine 38.

The power turbine 38 drives the drive shaft 42 that drives the fan 22. In this disclosed embodiment, the fan 22 is driven through a gearbox 40 at a speed different than the power turbine 38. It should be appreciated, that the fan 22 may be driven directly by the power turbine 38 at a speed different than the turbine section 32. The power turbine 38 may be configured to drive the fan 22 at a speed different than the turbine section 32 because it is not coupled to the gas generating core engine 70 and is not required to drive any portion of the compressor section 24. The bypass flow 48 may bypass the core engine 70 and exit through a fan nozzle schematically shown at 94.

An exhaust duct 68 is provided to direct exhaust gas flow from the power turbine 38 to a condenser 62. The condenser 62 extracts water from the exhaust gas flow 52. From the condenser 62, expelled exhaust gases 60 are exhausted through a core nozzle 58. Water extracted from the condenser 62 is converted to steam and injected into the core engine 70 to increase mass flow and thereby provide increased output power.

The engine 20 is configured to burn hydrogen provide by a fuel system 96. The fuel system 96 includes a liquid hydrogen ($LH_2$) tank 82 in communication with at least one pump 84. The pump 84 drives a fuel flow 80 to the combustor 30. $LH_2$ provides a thermal heat sink that can be utilized to cool various heat loads within the aircraft or engine as schematically indicated at 100. The heat loads may include, for example and without limitation, super conducting electrics, a working fluid of an environmental control system of the aircraft, an air conditioning heat exchanger, and engine working fluid heat exchangers. Heat accepted into the hydrogen fuel flow increase the overall fuel temperature prior to injection into the combustor 30.

A steam flow 56 generated by evaporating water in an evaporator 64 extracted from the exhaust gas flow 52 by the condenser 62. The water is transformed to steam in the evaporator 64 with heat from the exhaust gas flow 52 and injected into the combustor 30. In one disclosed embodiment, the evaporator 64 is disposed within an axial space 104 between the turbine section 32 and the power turbine 38. The evaporator 64 is thereby placed in thermal communication with the hot exhaust gas flow 52. Water extracted by the condenser 62 is communicated to the evaporator and converted to the steam flow 56 that is subsequently injected into the core engine 70.

The generated steam flow 56 may be injected into the core airflow 50 at the combustor 30 or just prior to the combustor 30 to improve performance by increasing mass flow and power output without additional work required by the compressor section 24. Steam flow 56 from the evaporator 64 may drive a steam turbine 102 to provide an additional work output prior to injection into the combustor 30.

The condenser 62 draws water, schematically indicated at 54, from the exhaust gas flow 52 and communicates the recovered water to water storage tank 90. The water storage tank 90 operates as an accumulator to provide sufficient water for operation during various engine operating conditions. The condenser 62 is in communication with a cold sink, schematically indicated at 98 that may be, for example, ram or fan air depending on the application and/or engine configuration.

The engine 20 has an increased power output from the injected steam 56 by increasing the mass flow through the turbine section 32 without a corresponding increase in work from the compressor section 24.

A water intercooling system 88 may be provide a water flow 86 that is communicated to the compressor section 24 to reduce a temperature of the core airflow 50 and increase mass flow. The water flow 86 may also be used as a cooling flow 78 to cool cooling air flow 74 communicated from the compressor section 24 to the turbine section 32. A heat exchanger 76 provides for the transfer of heat from the cooling air flow 74 into water. The heat from the cooling air flow 74 may vaporize the water into steam.

The example compressor section 24 includes a low pressure compressor (LPC) 26 and a high pressure compressor (HPC) 28. The turbine section 32 includes a high pressure turbine (HPT) 34 and a low pressure turbine (LPT) 38. The turbines 34, 36 and 38 are coupled to a corresponding compressor section. In this disclosed example, the high pressure turbine is coupled by a high shaft 46 to drive the high pressure compressor 28. A low shaft 44 couples the low pressure turbine 36 to the low pressure compressor 26.

A power shaft 42 is coupled to the power turbine 38 and the gearbox 40 to drive the fan 22. The example gearbox 40 is an epicyclical gear train, such as a planetary gear system, star gear system or other known gear system, with a gear reduction ratio of greater than about 2.3.

The additional power provided by the use of both hydrogen fuel and the injected steam flow 56 provides for the gas generating core engine 70 to be of a reduced size compared to engines of similar thrust capabilities. The smaller core engine 70 is further provided by the use of the power turbine 38. Because the power turbine 38 is not mechanically coupled to the core engine 70, it may be configured with respect to driving the fan 22 rather than both the fan 22 and some portion of the compressor section 24.

Figure 2:
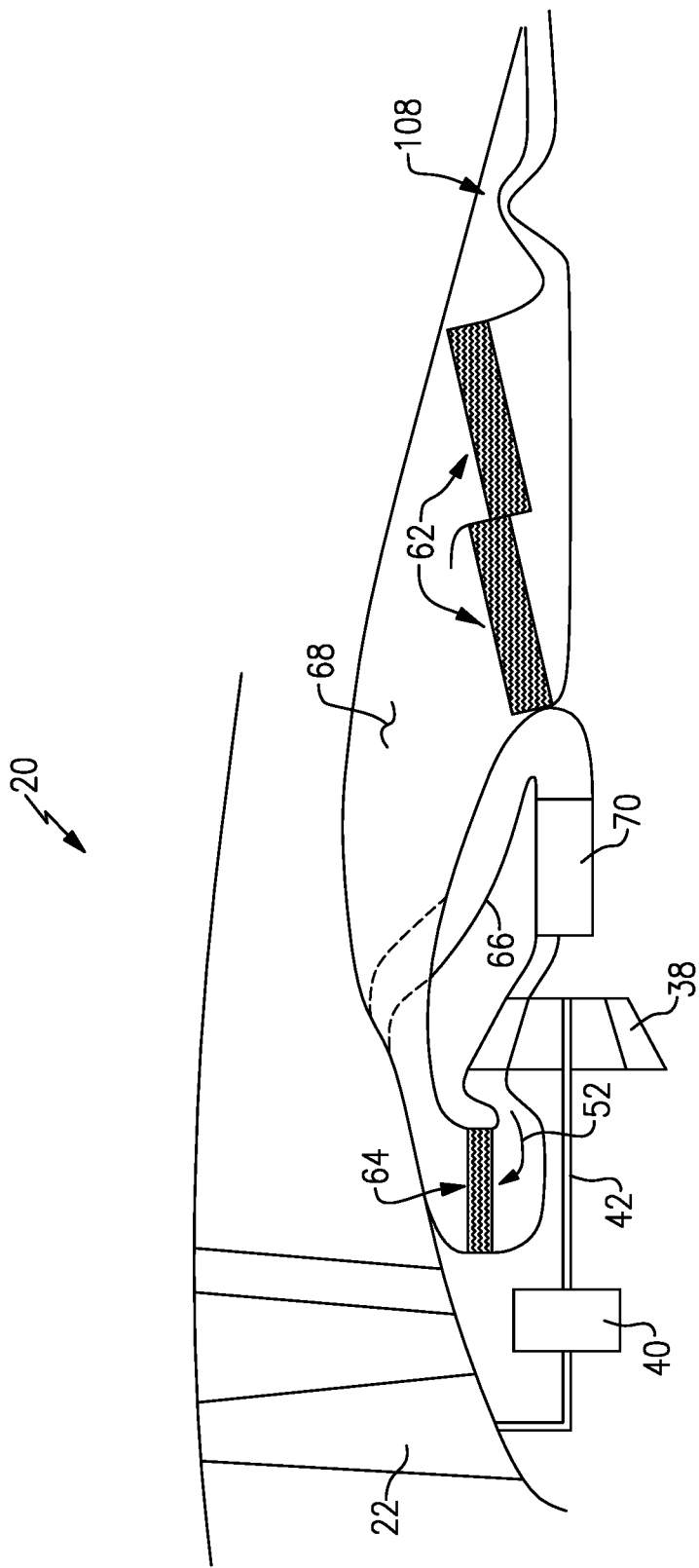
FIG. 2 is a simplified schematic view of the example propulsion system embodiment.

Referring to FIG. 2, with continued reference to FIG. 1, the example engine 20 is schematically shown to illustrate inlet and outlet ducting of core and exhaust flows relative to the core engine 70, power turbine 38, condenser 62 and the evaporator 64. Inlet airflow is communicated to an aft location of the core engine 70. The aft location 70 is an inlet to the compressor section 24 (FIG. 1). The inlet duct 66 communicates inlet airflow aft past a forward portion of the core engine 70 to the compressor section 24.

An outlet duct 68 communicates water containing exhaust gas flow aft to the condensers 62. Additionally, the outlet duct 68 provides thermal communication between the exhaust gas flow 52 and water extracted by the condenser in the evaporator 64. The exhaust gas flow 52 and water in the evaporator do not mix, but are in thermal communication such that water is heated and transformed into the steam flow 56 (FIG. 1).

Water extracted by the condenser 62 is separated from other residual gas flows and communicated to the storage tank 90. A water separator 108 is located downstream of the condenser 62 to separator the extracted liquid water from any remaining gas flows. The disclosed water separator 108 induces a radial component in the outgoing flow in combination with a radially outer inlet to direct water to the storage tank 90.

Figure 3:
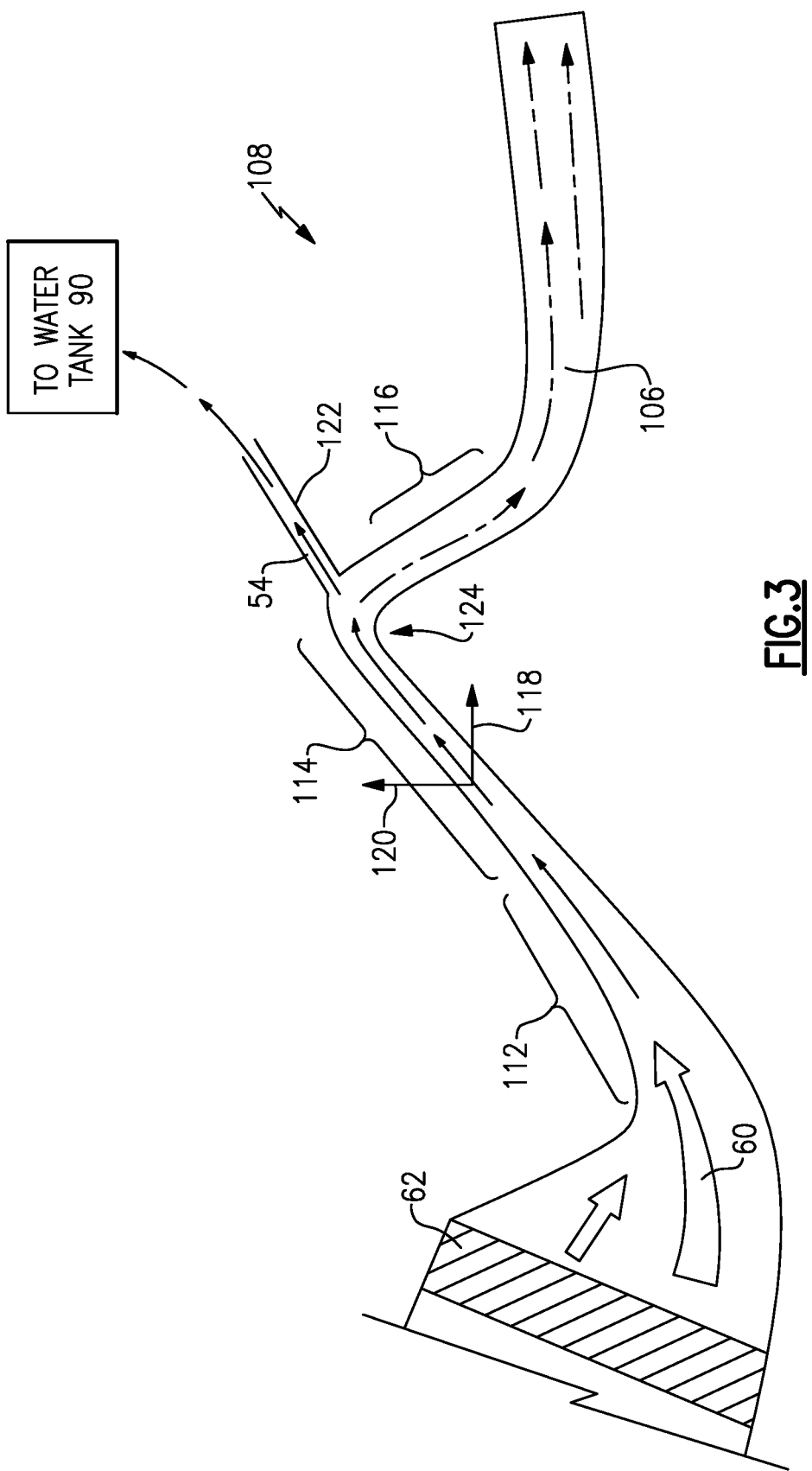
FIG. 3 is a schematic view of an example water separator embodiment.

Referring to FIG. 3, with continued reference to FIG. 2, the water separator 108 is a uniquely shaped duct that receives a mixed gas and liquid water flow 60 and directs the flow through a pinch point 124 to physically separate the liquid water flow from any residual gas flow. The example water separator 108 includes a first portion 112 that transitions from an axial directed orientation to a radial portion 114 with a substantially radially orientated direction that extends radially toward the pinch point 124. The radial portion 114 directs the flow radially outward and thereby directs the momentum of the flow 60 radially outward.

The flow 60 changes from a flow with a mostly axial directed flow force component in the first portion 112 to a flow with a mostly radial flow force component as indicated at 120. In the radial portion 114, the radial component 120 is much greater than that of any axially directed momentum flow force component as indicated at 118.

The radial flow force component drives the heavier liquid water radially outward toward the pinch point 124. The pinch point 124 is an apex that turns the flow back radially inward toward the outlet portion 116 and a more axially directed flow.

At the pinch point 124 is located an outlet 122. The heavier liquid water is driven radially outward more than that of any residual exhaust gases 106 and thereby is driven into the outlet 122. The outlet 122 directs the liquid water to the water storage tank 90. The remaining gas flow 106 moves past the pinch point 124 and out through the outlet portion 116. The outlet portion 116 may direct the gas flow 106 to the surrounding ambient environment or may direct the exhaust flow to another device for further processing and or thermal transfer.

The example water separator 108 is shown in cross-section and may comprise a plurality of round conduits disposed about an engine axis. The example water separator 108 may also be a continuous annular duct disposed about the engine axis.

Although the example engine 20 and water separator 108 is described and shown by way of example as a three spool engine, other engine configurations, such as two-spool may also benefit from this disclosure and are within the contemplation and scope of this disclosure.

Although an example engine configuration is described by way of example, it will be appreciated that other engine configurations may include additional structures and features and are within the contemplation and scope of this disclosure.

Accordingly, the disclosed assemblies provide for the advantageous use of ammonia fuel to improve engine efficiency and reduce carbon emission. The disclosed systems use the advantageous thermal capacity of ammonia to maximize the recapture of heat and cool other working flows of the engine.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A propulsion system for an aircraft comprising:
   a gas generating core engine including a core flow path where a core airflow is compressed in a compressor section, communicated to a combustor section, mixed with a hydrogen based fuel and ignited to generate an exhaust gas flow that is expanded through a turbine section;
   a power turbine engine forward of the core engine;
   a propulsor coupled to the power turbine;
   a hydrogen fuel system configured to supply hydrogen fuel to the combustor through a fuel flow path;
   a condenser arranged along the core flow path and configured to extract water from the exhaust gas flow;
   a water separator in communication with the condenser directing the extracted water to a water storage tank, wherein the water separator comprises an inlet portion, a radial portion and an outlet portion, the radial portion directing a flow of a water and gas radially outward and an outlet disposed between the radial portion and the outlet portion, the outlet in fluid communication with the water storage tank; and
   an evaporator arranged along the core flow path and configured to receive a portion of the water extracted by the condenser to generate a steam flow, wherein the steam flow is injected into the core flow path upstream of the turbine section.

2. The propulsion system as recited in claim 1, wherein the inlet portion includes an inlet flow area, the radial portion includes a radial flow area and the outlet portion includes an outlet flow area, the radial flow area is less than either the inlet flow area or the outlet flow area.

3. The propulsion system as recited in claim 1, wherein a radial flow force component is induced into the flow within the radial portion for expelling water through the outlet and directing gas flow to the outlet portion.

4. The propulsion system as recited in claim 3, wherein the outlet is disposed on a radially outer side of the water separator.

5. The propulsion system as recited in claim 1, wherein the turbine section of the core engine is engine forward of the compressor section and an inlet duct communicates inlet air to the compressor section.

6. The propulsion system as recited in claim 5, wherein the evaporator is disposed within an axial space forward of the power turbine.

7. The propulsion system as recited in claim 6, including an exhaust duct communicating exhaust flow from the power turbine to the condenser, wherein the exhaust duct is engine forward of the core engine.

8. The propulsion system as recited in claim 1, wherein the condenser is in thermal communication with a cold sink.

9. The propulsion system as recited in claim 1, including an intercooling system to cool portions of the core airflow in the compressor section, wherein the intercooling system is configured inject water communicated from the condenser into the compressor section.

10. The propulsion system as recited in claim 1, including a cooled cooling air passage communicating core flow from the compressor section to the turbine section, wherein a heat exchanger is disposed to cool the core flow with water from the condenser.

11. The propulsion system as recited in claim 1, wherein the steam flow from the evaporator is injected into the combustor.

12. The propulsion system as recited in claim 1, including a gearbox coupled to the power turbine, wherein the power turbine is configured to drive the propulsor section through the gearbox.

13. A propulsion system for an aircraft comprising:
a gas generating core engine including a core flow path axially arranged through a compressor section, a combustor section and a turbine section, wherein the turbine section is engine forward of the compressor section;
a hydrogen fuel system configured to supply a hydrogen fuel to the combustor through a fuel flow path;
a condenser arranged engine forward of the turbine section and configured to extract water from an exhaust gas flow;
a water separator in communication with the condenser and directing the extracted water radially outward through an outlet to a water storage tank, the water separator comprises an inlet portion, a radial portion and an outlet portion, the radial portion directing a flow of a water and gas radially outward, wherein the inlet portion includes an inlet flow area, the radial portion includes a radial flow area and the outlet portion includes an outlet flow area, the radial flow area is less than either the inlet flow area or the outlet flow area; and
an evaporator arranged along the core flow path and configured to receive a portion of the water extracted by the condenser to generate a steam flow, wherein the steam flow is injected into the core flow path upstream of the turbine section.

14. The propulsion system as recited in claim 13, wherein a radial flow force component is induced into the flow within the radial portion for expelling water through the outlet and directing gas flow to the outlet portion.

15. The propulsion system as recited in claim 13, including a power turbine engine forward of the turbine section, the power turbine rotatable independent of the turbine section, wherein the exhaust gas flow is communicated engine forward from the turbine section to the power turbine.

16. The propulsion system as recited in claim 13, including an exhaust duct communicating exhaust flow from the power turbine to the condenser, wherein the exhaust duct is engine forward of the core engine.

* * * * *